United States Patent
Li et al.

(10) Patent No.: US 9,424,476 B2
(45) Date of Patent: Aug. 23, 2016

(54) METHOD FOR DETECTING A VEHICLE SUNVISOR'S STATE

(71) Applicants: Sun Yat-sen University, Guangzhou, Guangdong (CN); Guangdong Fundway Technology Co., Ltd., Guangzhou, Guangdong (CN)

(72) Inventors: Xiying Li, Guangzhou (CN); Ling Chen, Guangzhou (CN)

(73) Assignees: SUN YAT-SEN UNIVERSITY, Guangzhou (CN); GUANGDONG FUNDWAY TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 14/438,895

(22) PCT Filed: Oct. 25, 2013

(86) PCT No.: PCT/CN2013/085951
§ 371 (c)(1),
(2) Date: Apr. 28, 2015

(87) PCT Pub. No.: WO2015/024294
PCT Pub. Date: Feb. 26, 2015

(65) Prior Publication Data
US 2016/0171318 A1 Jun. 16, 2016

(30) Foreign Application Priority Data
Aug. 20, 2013 (CN) .......................... 2013 1 0365024

(51) Int. Cl.
*G06K 9/00* (2006.01)
*G06T 7/00* (2006.01)
*G06T 7/40* (2006.01)

(52) U.S. Cl.
CPC ......... *G06K 9/00832* (2013.01); *G06T 7/0008* (2013.01); *G06T 7/0085* (2013.01); *G06T 7/408* (2013.01); *G06T 2207/30268* (2013.01)

(58) Field of Classification Search
None
See application file for complete search history.

(56) References Cited

U.S. PATENT DOCUMENTS

| | | | | |
|---|---|---|---|---|
| 2015/0066310 | A1* | 3/2015 | Kim | G05D 3/10 701/49 |
| 2015/0310258 | A1* | 10/2015 | Omi | A61B 5/18 348/148 |

FOREIGN PATENT DOCUMENTS

| | | |
|---|---|---|
| CN | 1710596 A | 12/2005 |
| CN | 101179710 A | 5/2008 |
| CN | 101183427 A | 5/2008 |
| CN | 101859382 A | 10/2010 |

OTHER PUBLICATIONS

International Search Report for International Application No. PCT/CN2013/085951, International Filing Date October 25, 2013, pp. 1-4.

* cited by examiner

*Primary Examiner* — Atiba O Fitzpatrick
(74) *Attorney, Agent, or Firm* — William Greener; Bond, Schoeneck & King, PLLC

(57) ABSTRACT

A method for detecting a vehicle sunvisor's state includes obtaining a detected image; conducting a gray-scale preprocessing on the detected image, to obtain a gray-level image; conducting a main connected region extraction on the gray-level image, and calculating a geometric feature and a rectangle similarity of each main connected region; conducting a horizontal long edge extraction on the gray-level image, and conducting feature matching operation between horizontal long edges and main connected regions to obtain a region edge matching relationship; determining the sunvisor's state based on the region edge matching relationship, the geometric feature of main connected regions and rectangle similarity of main connected regions. The present invention can be widely applied in the field of image process.

9 Claims, 3 Drawing Sheets

METHOD FOR DETECTING A VEHICLE SUNVISOR'S STATE

RELATED APPLICATION DATA

This application is a U.S. National Stage Application that claims priority to PCT Application No. PCT/CN2013/085951 filed 25 Oct. 2013, which claims priority to 201310365024.2 CN filed 20 Aug. 2013, the subject matters of which are incorporated herein by reference in their entireties.

TECHNICAL FIELD

The present invention relates to the field of image processing, particularly to a method for detecting a vehicle sunvisor's state.

BACKGROUND OF THE INVENTION

The sunvisor is mounted on a foreside windscreen of an automobile, it can prevent the sunlight from irritating to human eyes, and may be laid down or adjusted to a suitable angel by a driver himself. At present, some outlaws may lay down the sunvisor at night, to obscure their facial features by using shielding of the sunvisor, and to prevent their facial features being shot by a vehicle security system, thereby avoiding legal sanctions. In order to alert such case in advance and to promptly feedback dubiety of the vehicle and thus effectively provide reference information to the police, a rapid and effective detection to the vehicle sunvisor's state is necessary.

However, due to influence by the objective factors such as road complexity and environment in vehicle, the existing method for detecting a vehicle sunvisor's state at night has the following problems: 1, the road texture has certain influences on the sunvisor detection; 2, an object with a similar shape (such as a rectangular object put in the vehicle, a label stuck on the window and etc.) is easy to be regarded as the sunvisor, resulting in a false detection; 3, due to its low practicality, it is difficult to be applied into an actual vehicle security system. These factors severely influence the detection efficiency and the detection precision of the sunvisor's state. Therefore, there is not a perfect and mature algorithm for sunvisor's state detection at night-time, which can be applied in an actual situation.

SUMMARY OF THE INVENTION

In order to resolve the technical problems described above, an objective of the present invention is to provide a method for detecting a vehicle sunvisor's state with high efficiency, precision and practicality, to meet the requirement of safe alerting of the police.

The technical solution adopted by the present invention to resolve above technical problems is a method for detecting the vehicle sunvisor's state, comprising:

A, obtaining a detected image;

B, conducting a gray-scale preprocessing on the detected image, to obtain a gray-level image;

C, conducting a plurality of main connected regions extraction on the gray-level image, and calculating a geometric feature and a rectangle similarity of each main connected region;

D, conducting a plurality of horizontal long edges extraction on the gray-level image, and conducting a feature matching operation between horizontal long edges and main connected regions, to obtain a plurality of region-edge matching relationships;

E, determining the state of the sunvisor, based on the region-edge matching relationship, the geometric feature of main connected regions and the rectangle similarity of the main connected regions.

Furthermore, said step B comprises:

B1, conducting a color image grayscaling on the detected image, to obtain a gray-scale image;

B2, conducting a gray stretching on the gray-scale image, to obtain a stretched image;

B3, removing a high-light region of the stretched image by using a mathematical morphology method, to obtain a gray-level image.

Furthermore, said step C comprises:

C1, conducting a thresholding on the gray-level image by using a preset threshold, to obtain a binary image;

C2, conducting the mathematical morphology processing on the binary image, to obtain a morphologically calculated image;

C3, conducting an elimination processing on the morphologically calculated image based on the prior knowledge of the sunvisor shape, to obtain main connected regions;

C4, calculating the geometric feature and the rectangle similarity of each main connected region.

Furthermore, said step C4 comprises:

C41, calculating a geometric feature of each main connected region;

C42, extracting an equivalent rectangle of each main connected region, and calculating a geometric feature of the equivalent rectangle;

C43, calculating a rectangle similarity of each main connected region, based on the geometric feature of the main connected region and the geometric feature of the equivalent rectangle.

Furthermore, the geometric features of said each main connected region include position of mass center, position of gravity center, width, height, aspect ratio, area, enclosing rectangle and area of the enclosing rectangle of the main connected region; the geometric features of said equivalent rectangle include position and area of the main connected region.

Furthermore, the step of conducting the horizontal long edge extraction at said step D comprises:

D1, conducting an edge extraction on the gray-level image, to obtain an edge image;

D2, conducting a plurality of horizontal edge points extraction on the edge image, to obtain a horizontal edge image;

D3, extracting horizontal long edges from the horizontal edge image by using a connected domain theory.

Furthermore, the step of conducting a feature matching between horizontal long edges and main connected regions to obtain a region-edge matching relationship in said step D is specifically as follows:

conducting a feature matching between horizontal long edges and main connected regions to determine whether there are a top edge and a bottom edge matching with the horizontal long edges in each main connected region, thereby obtaining a plurality of region-edge matching relationships.

Furthermore, said step E comprises:

E1, determining whether there is an edge matching with a main connected region based on the region-edge matching relationship; if not, conducting step E2, otherwise, conducting step E3;

E2, determining whether the position relationship of the main connected region is correct based on the geometric feature and the horizontal long edge of the main connected region; if yes, conducting step E3, otherwise, conducting step E5;

E3, determining the rectangle similarity of the main connected region whether meets a preset threshold condition; if meets, conducting step E4, otherwise, conducting step E5;

E4, determining the vehicle sunvisor's state as being laid down, and recording the position of the sunvisor in the gray-level image;

E5, determining the vehicle sunvisor's state as being pulled up.

Furthermore, said detected image is an image of a front window of the vehicle.

The beneficial effect of the present invention is as follows: to detect the sunvisor's state by comprehensively utilizing geometric features of main connected regions, the rectangle similarity of main connected regions and region-edge matching relationships based on the mathematical morphology and the connected domain theory, the present invention can effectively reduce the influence of the factors such as road texture and environment in vehicle on the sunvisor's state detection; the detection efficiency and the detection precision are high, the detection accuracy may be above 90%; and the present invention can be applied in an actual vehicle security system to effectively detect whether the sunvisor is in a laid-down state at night with high practicality.

BRIEF DESCRIPTION OF DRAWINGS

The present invention will be further described in conjunction with the attached drawings and the examples.

DETAILED DESCRIPTION OF EMBODIMENTS

For ease of the reference hereinafter, first the definition or the explanation of the following nouns are provided:

A method of vehicle sun visor's state detection: a method for detecting vehicle sunvisor's state;

Gray Stretching: one of basic ways of image grayscale transformation, in which a grayscale of an image is transformed by a simple transformation function, to improve a dynamic range of the grayscale during the image processing.

Figure 1:
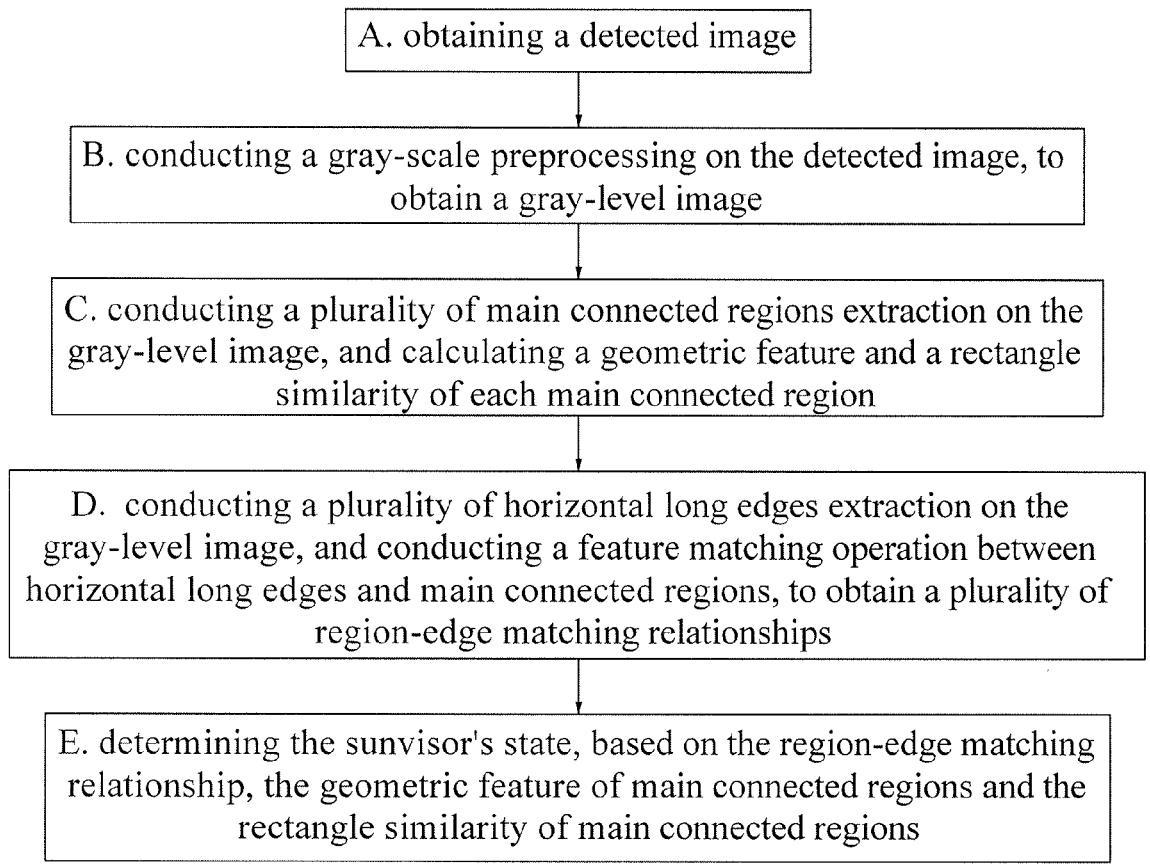
FIG. 1 is a flowchart of the method for detecting a sunvisor's state of the vehicle according to the present invention.

Referring to FIG. 1, a method for detecting a vehicle sunvisor's state comprises:

A, obtaining a detected image;

B, conducting a gray-scale preprocessing on the detected image, to obtain a gray-level image;

C, conducting a plurality of main connected regions extraction on the gray-level image, and calculating a geometric feature and a rectangle similarity of each main connected region;

D, conducting a plurality of horizontal long edges extraction on the gray-level image, and conducting a feature matching operation between horizontal long edges and main connected regions, to obtain a plurality of region edge matching relationships;

E, determining the sunvisor's state, based on the region-edge matching relationship, the geometric feature of main connected regions and the rectangle similarity of main connected regions.

Wherein, the detected image is an image of a front window of the vehicle.

Geometric features of main connected regions include position of mass center, position of gravity center, width, height, aspect ratio, area, enclosing rectangle and the area of the enclosing rectangle etc.

The region edge matching relationship denotes whether there is an edge in the main connected region which matches with the horizontal long edge (i.e., whether the main connected region is close to the position of the horizontal long edge).

The main connected region is candidate regions for the vehicle sunvisors.

According to the present invention, various image features of sunvisors at night are analyzed. First, the effective features (including the geometric feature, the rectangle similarity and the edge matching relationship of the main connected region etc.) that can be used in determination of the sunvisor's state are extracted by conducting main connected region extraction, horizontal long edge extraction and region-edge feature matching. Then the sunvisor's state is determined based on the extracted features efficiently and accurately.

Figure 2:
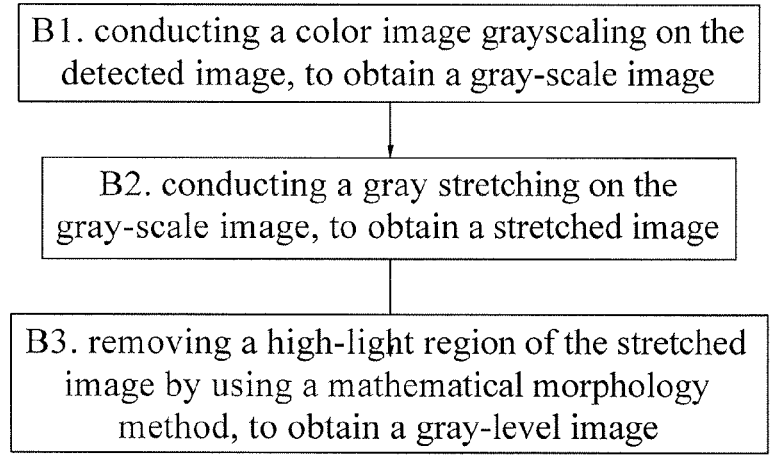
FIG. 2 is a flowchart of step B of the present invention.

Furthermore, referring to FIG. 2, as a preferred embodiment, the step B comprise:

B1, conducting a color image grayscaling on the detected image, to obtain a gray-scale image;

B2, conducting a gray stretching on the gray-scale image, to obtain an stretched image;

B3, removing a high-light region of the stretched image by using a mathematical morphology method, to obtain a gray-level image.

The step of conducting a gray pre-processing on the detected image to obtain the gray image according to the invention is as follow:

First, a color image grayscaling is conducted on the detected image. The formula used for the color image grayscaling is as follow:

$$I = \frac{r+g+b}{3}$$

In the formula, r, g and b are respectively components of red channel, green channel, and blue channel; I is the intensity value of a pixel point.

Then, an image brightness is modified into a reasonable range by using a gray stretching method.

Finally, the high-light region is removed from the image by using the mathematical morphology.

Figure 3:
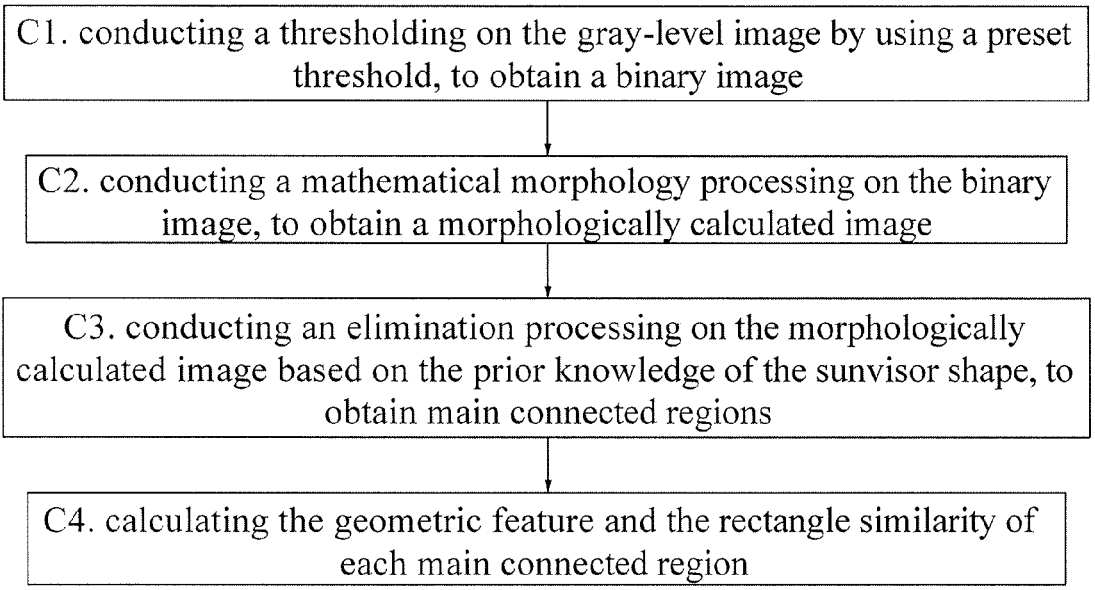
FIG. 3 is a flowchart of step C of the present invention.

Furthermore, referring to FIG. 3, as a preferred embodiment, the step C comprises:

C1, conducting a thresholding on the gray-level image by using a preset threshold, to obtain a binary image;

C2, conducting a mathematical morphology processing on the binary image, to obtain a morphologically calculated image;

C3, conducting an elimination processing on the morphologically calculated image based on the prior knowledge of the sunvisor shape, to obtain main connected regions;

C4, calculating a geometric feature and a rectangle similarity of each main connected region.

Wherein, a mathematical morphology calculation processing is conducted on the binary image, including an opening operation processing and a longitudinal closing operation processing.

The opening operation processing refers to conducting a mathematical morphology opening operation processing on the binary image by using a structural element with a suitable size, to remove human faces adhered with the sunvisors in the binary image.

In some cases, due to the influence of light, there may be a longitudinal fracture in the sunvisor-regions after the binarization. To resolve such a problem, it is needed to conduct a longitudinal closing operation processing on the mathematical morphology opening calculated image. The procedure of the longitudinal closing calculation processing is as follow: first, each region of the binary image is labeled; thereby obtaining a label image of the binary image; then, a longitudinal closing operation calculation is conducted on the image, thereby obtaining a longitudinal closing operation calculated image (i.e., a morphologically calculated image). After the longitudinal closing operation processing, the longitudinal fractures in the same labeled region is linked together, and no regions merging is caused.

Conducting an elimination processing on the morphologically calculated image refers to eliminate regions in the morphologically calculated image whose width, height, area and aspect ratio do not meet the prior knowledge of the sunvisor shape, thereby obtaining main connected regions.

The geometric feature and the rectangle similarity of the main connected region are all used in the subsequent sunvisor's state determination.

Figure 4:
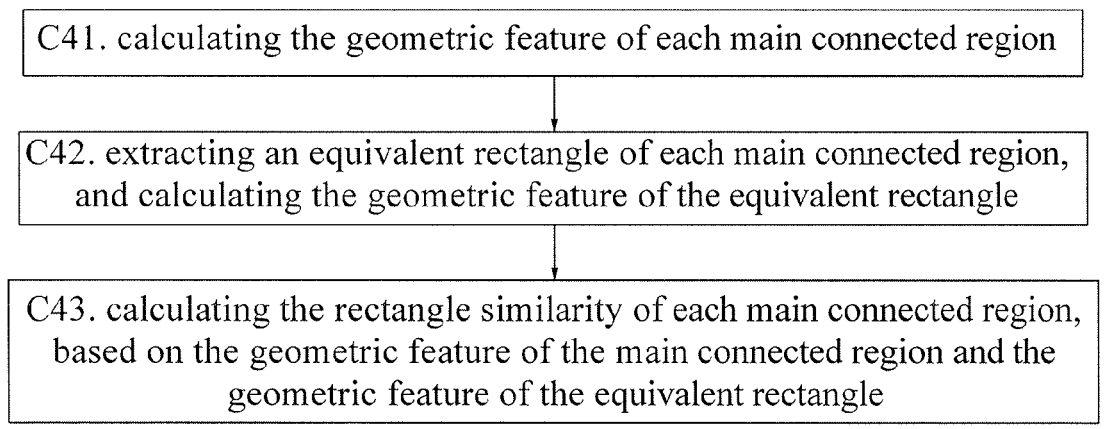
FIG. 4 is a flowchart of step C4 of the present invention.

Furthermore, referring to FIG. 4, as a preferred embodiment, the step C4 comprises:

C41, calculating a geometric feature of each main connected region;

C42, extracting an equivalent rectangle of each main connected region, and calculating a geometric feature of the equivalent rectangle;

C43, calculating a rectangle similarity of each main connected region, based on the geometric feature of the main connected region and the geometric feature of the equivalent rectangle.

Wherein, the geometric feature of the equivalent rectangle includes position of the equivalent rectangle and area of the equivalent rectangle, etc. The enclosing rectangle of the main connected region refers to an enclosing rectangle of an exterior outline of the main connected region. The equivalent rectangle of the main connected region refers to a rectangle meeting the following principles: 1) the gravity center of the equivalent rectangle is same as the gravity center of the main connected region; 2) the difference between the area of the equivalent rectangle and the area of the main connected region area is smaller than the preset threshold.

There are two measuring parameters for the rectangle similarity of the main connected region: $r_1$ and $r_2$. The calculating formula of $r_1$ and $r_2$ are respectively:

$$r_1 = \frac{S}{S_c} \text{ and } r_2 = \frac{S_r}{S_e}$$

in the formula, S is the area of the main connected region, $S_c$ represents the area of the enclosing rectangle, $S_r$ represents the remaining area after the equivalent rectangle is removed from the main connected region, and $S_e$ represents the area of the equivalent rectangle. The more $r_1$ being close to 1, the more the main connected region is similar to a rectangle, and $r_1$ being more small indicates that the main connected region has noise points which make the region severely deviating from a rectangle; $r_2$ being more close to 0 indicates that the main connected region is more similar to a rectangle. These two parameters jointly determine the degree of the main connected region being similar to the rectangle. Therefore, by calculating $r_1$ and $r_2$ based on area of the main connected region, area of the enclosing rectangle and area of the equivalent rectangle, the rectangle similarity of the main connected region may be obtained.

Furthermore, as a preferred embodiment, the geometric features of said each main connected region include position of mass center, position of gravity center, width, height, aspect ratio, area, enclosing rectangle and area of the enclosing rectangle of the main connected region; the geometric features of said equivalent rectangle include position and area of the equivalent rectangle.

Figure 5:
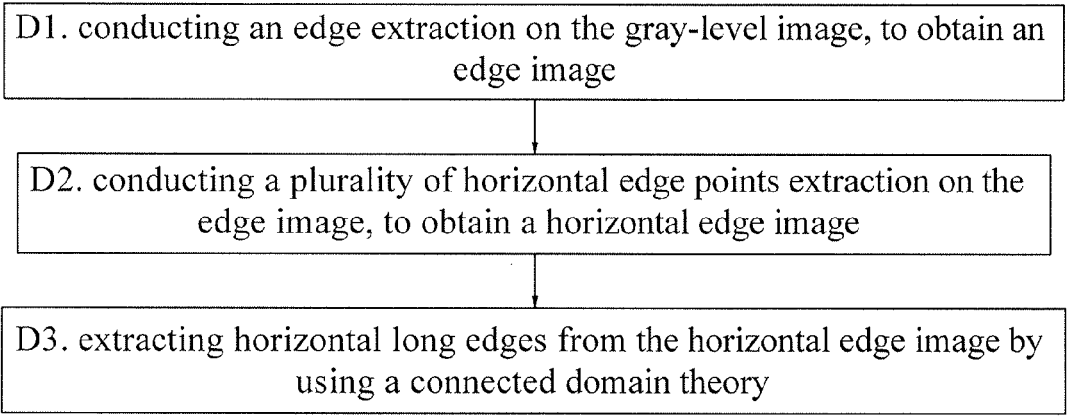
FIG. 5 is a flowchart of the step of the horizontal long edge extraction on the gray-level image in step D according to the present invention.

Furthermore, referring to FIG. 5, as a preferred embodiment, the step of conducting the horizontal long edge extraction on the gray-level image in the step D comprises:

D1, conducting an edge extraction on the gray-level image, to obtain an edge image;

D2, conducting a plurality of horizontal edge points extraction on the edge image, to obtain a horizontal edge image;

D3, extracting horizontal long edges from the horizontal edge image by using the connected domain theory.

Wherein, the horizontal long edge is horizontal edges which are longest.

Furthermore, as a preferred embodiment, the step of conducting the feature matching between horizontal long edges and main connected regions to obtain a region-edge matching relationship in the step D is specifically as follows:

conducting a feature matching between horizontal long edges and main connected regions to determine whether there are a top edge and a bottom edge matching with the horizontal long edges in each main connected region, thereby obtaining a plurality of region-edge matching relationships.

Since the sunvisor region is generally a rectangular region, there is generally a horizontal edge around the region, thus it is possible to determine whether the region is the sunvisor region by using this condition.

Figure 6:
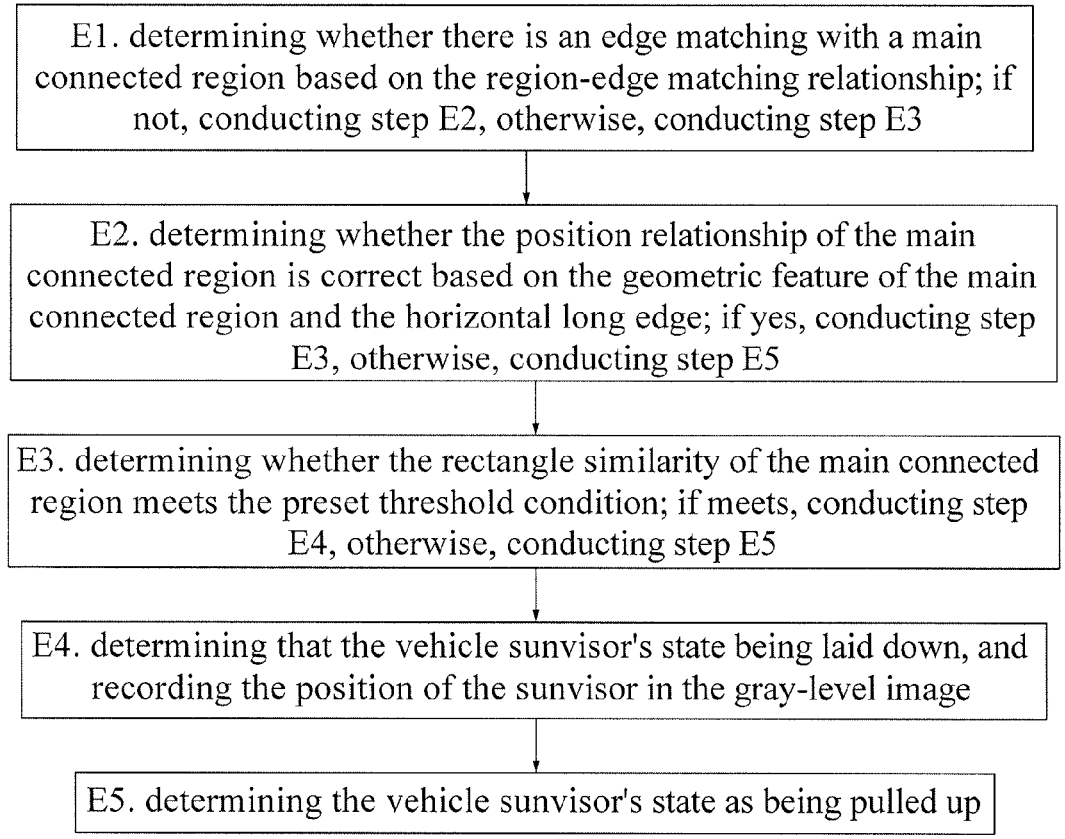
FIG. 6 is a flowchart of step E of the present invention.

Furthermore, referring to FIG. 6, as a preferred embodiment, the step E comprises:

E1, determining whether there is an edge matching with a main connected region based on the region-edge matching relationship; if not, conducting step E2, otherwise, conducting step E3;

E2, determining the position relationship of the main connected region is correct based on the geometric feature and the horizontal long edge of the main connected region; if yes, conducting step E3, otherwise, conducting step E5;

E3, determining whether the rectangle similarity of the main connected region meets the preset threshold condition; if meets conducting step E4, otherwise, conducting step E5;

E4, determining the vehicle sunvisor's state as being laid down, and recording the position of the sunvisor in the gray-level image;

E5, determining the vehicle sunvisor's stat as being pulled up.

The present invention comprehensively considers the influence of the factors such as the region-edge matching relationship, the geometric feature and the rectangle similarity of the main connected region, etc. when determining the vehicle sunvisor's state at night. Compared with the prior art, the detection precision of the present invention is higher.

Furthermore, as a preferred embodiment, the detected image is an image of a front window of the vehicle.

Compared with the prior art, the present invention proposes an efficient and practical method for detecting a sunvisor's state at night based on the mathematical morphology and the connected domain theory, it can effectively reduce the influence on the sunvisor's state detection by the factors such as the road texture and the environment in vehicle, the detection accuracy can be above 90%, it can be applied in the actual vehicle security system to effectively detect whether the sunvisors are in a laid-down state at night, thereby assisting the police to investigate various rule-breaking or illegal behaviors.

Although the preferred embodiment of the present invention has been described in detail hereinbefore, the present invention is not limited to the examples, one skilled in the art may make a variety of equivalent variations or substitutions without departing the spirit of the present invention, these equivalent variations or substitutions are all included in the scope defined by the claim of the present application.

The invention claimed is:

1. A method for detecting a vehicle sunvisor's state, comprising:
   obtaining a detected image;
   conducting a gray-scale preprocessing on the detected image, to obtain a gray-level image;
   conducting a plurality of main connected regions extraction on the gray-level image, and calculating a geometric feature and a rectangle similarity of each main connected region;
   conducting a plurality of horizontal long edges extractions on the gray-level image, and conducting a feature matching operation between the horizontal long edges and the main connected regions, to obtain a plurality of region-edge matching relationships; and
   determining the sunvisor's state, based on the region-edge matching relationship, the geometric feature of main connected regions and the rectangle similarity of main connected regions.

2. The method of claim 1, wherein conducting a gray-scale preprocessing on the detected image to obtain a gray-level image further comprises:
   conducting a color image grayscaling on the detected image, to obtain a gray-scale image;
   conducting a gray stretching on the gray-scale image, to obtain an stretched image; and
   removing a high-light region of the stretched image by using a mathematical morphology method, to obtain a gray-level image.

3. The method of claim 1, wherein conducting a plurality of main connected regions extraction on the gray-level image, and calculating a geometric feature and a rectangle similarity of each main connected region further comprises:
   conducting a thresholding on the gray-level image by using a preset threshold, to obtain a binary image;
   conducting a mathematical morphology processing on the binary image, to obtain a morphologically calculated image;
   conducting an elimination processing on the morphologically calculated image based on the prior knowledge of the sunvisor shape, to obtain main connected regions; and
   calculating the geometric feature and the rectangle similarity of each main connected region.

4. The method of claim 3, wherein calculating the geometric feature and the rectangle similarity of each main connected region further comprises:
   calculating the geometric feature of each main connected region;
   extracting an equivalent rectangle of each main connected region, and calculating the geometric feature of the equivalent rectangle; and
   calculating the rectangle similarity of each main connected region, based on the geometric feature of the main connected region and the geometric feature of the equivalent rectangle.

5. The method of claim 4, wherein the geometric features of said each main connected region includes at least one of position of mass center, position of gravity center, width, height, aspect ratio, area, enclosing rectangle, and area of the enclosing rectangle, further wherein the geometric features of said equivalent rectangle includes at least one of position and area.

6. The method of claim 1, wherein conducting a horizontal long edge extraction on the gray-level image further comprises:
   conducting an edge extraction on the gray-level image, to obtain an edge image;
   conducting a plurality of horizontal edge points extraction on the edge image, to obtain a horizontal edge image; and
   extracting horizontal long edges from the horizontal edge image by using a connected domain theory.

7. The method of claim 1, wherein conducting a feature matching between horizontal long edges and main connected regions to obtain a region-edge matching relationship further comprises conducting a feature matching between horizontal long edges and main connected regions to determine whether there are a top edge and a bottom edge matching with the horizontal long edges in each main connected region, thereby obtaining a plurality of region-edge matching relationships.

8. The method of claim 1, wherein determining the sunvisor's state, based on the region-edge matching relationship, the geometric feature of main connected regions and the rectangle similarity of main connected regions further comprises:
   determining whether there is an edge matching with a main connected region based on the region-edge matching relationship; if not, conducting step E2, otherwise, conducting step E3;
   determining whether the position relationship of the main connected region is correct based on the geometric feature of the main connected region and the horizontal long edge, if correct, conducting step E3, otherwise, conducting step E5;
   determining whether the rectangle similarity of the main connected region meets the preset threshold condition; if meets, conducting step E4, otherwise, conducting step E5;
   determining that the vehicle sunvisor's state as being laid down, and recording the position of the sunvisor in the gray-level image; and
   determining the vehicle sunvisor's state as being pulled up.

9. The method of claim 1, wherein said detected image is an image of a front-facing window of the vehicle.

* * * * *